April 8, 1952  J. O. ALLSTOTT  2,592,231
FEED PREPARATION DEVICE
Filed Jan. 7, 1949
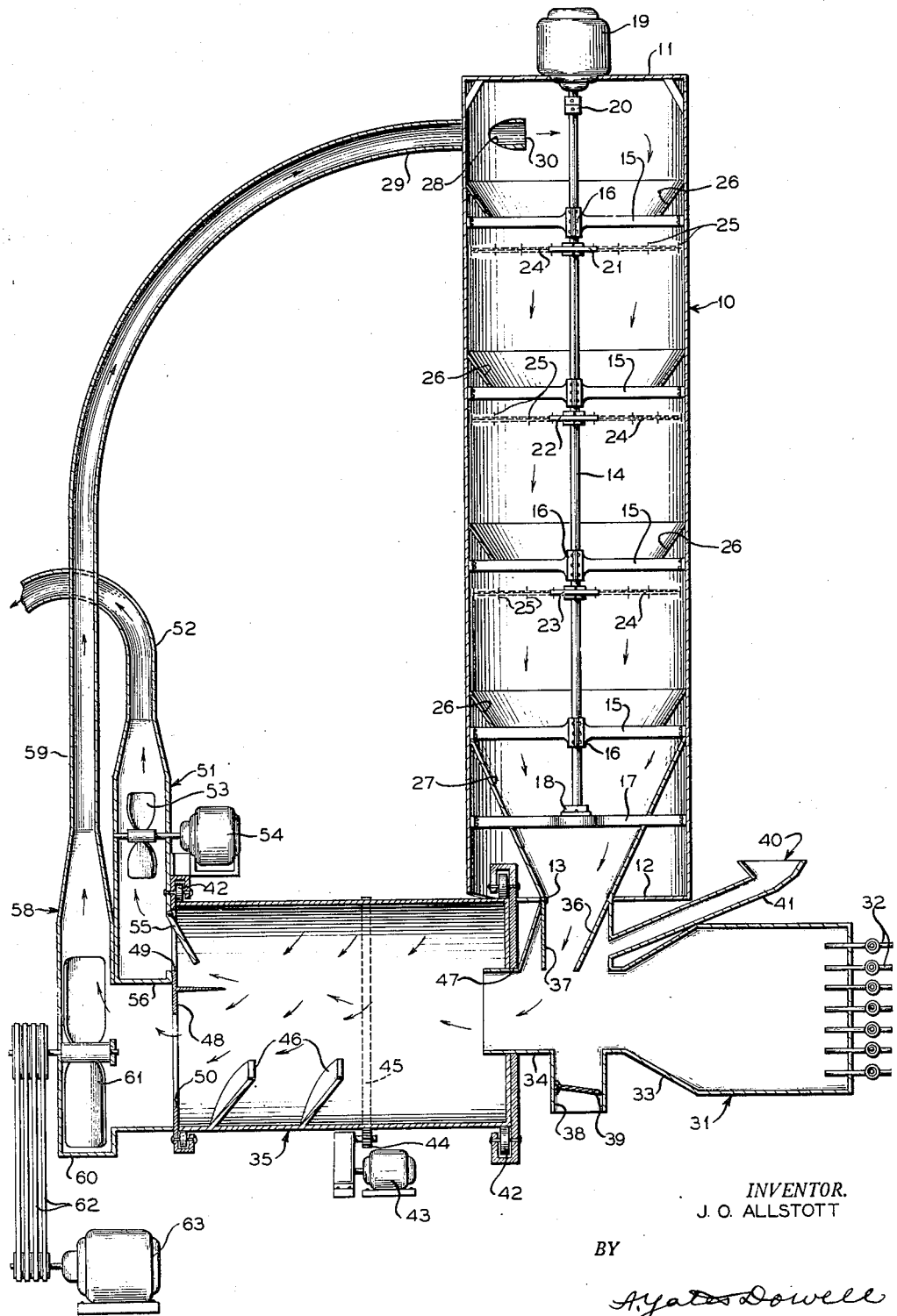
INVENTOR.
J. O. ALLSTOTT
BY
A. Yates Dowell
ATTORNEY Patented Apr. 8, 1952

2,592,231

UNITED STATES PATENT OFFICE 2,592,231

FEED PREPARATION DEVICE

James O. Allstott, Pauls Valley, Okla.

Applicaton January 7, 1949, Serial No. 69,789

6 Claims. (Cl. 99—235)

This invention relates to the feeding of animals and more particularly to equipment employed in the preparation of such feeds particularly the comminuting, mixing and drying of the same.

The invention is particularly concerned with equipment for comminuting, mixing and drying feeds such as ensilage including alfalfa, soy beans, various grasses, stalks, and the like. Prior to the storage or use as feed of materials of the type mentioned above, it is desired that they be conditioned by drying in order that excess moisture or liquid, which the green ensilage contains, may be removed. It is also necessary and desirable that the stalks and the like be cut into smaller pieces and mixed with other foods in order that the most satisfactory and nutritious feed for the livestock concerned will be obtained.

In the past various means for preparing feed of this character have been employed including drying by weathering and artificial means, and various kinds of manually or machine driven choppers have been employed. Commonly these devices have required considerable attention and effort and have not been entirely satisfactory for that and other reasons.

Accordingly, it is an object of the present invention to provide a feed preparation device adapted to be automatically operated in an efficient and expeditious manner.

A further object of the inventon is to provide a device in which any or all of the steps of comminuting, drying, and mixing of ensilage type feeds may be carried out with a minimum of attention.

A further object of the invention is the provision of a novel mixer and chopper for ensilage type feeds.

A still further object of the invention is the provision of a novel means for drying feeds.

Another object of the invention is the provision of a relatively inexpensive and durable feed preparation device which may be constructed in large part from materials readily accessible.

Further objects and advantages of the invention will be apparent from the following description taken in conjunction with the accompanying drawing, wherein:

The sole figure is a vertical section through a device constructed in accordance with the present invention.

Referring to the drawing, a tower or elongated vertical drum 10 is disclosed which is preferably cylindrical in cross section although other configuration may be employed. The drum is provided with an upper end 11 and a lower end 12 having a discharge opening 13.

Substantially axially of the drum is a shaft 14 positioned and supported by a plurality of struts or spokes 15 which are attached to the walls of the drum and are joined by collars 16 encircling the shaft. A lower supporting member 17 is provided with a thrust type bearing 18 which receives the lower end of the shaft 14. For rotating the shaft a suitable source of power or motor 19 is secured to the end 11 of the drum and is attached to the shaft by suitable coupling means 20.

Secured to the shaft at spaced intervals are a plurality of disc or plate members 21, 22 and 23. Each of the plate members has a plurality of flails or chains 24 attached to their peripheries. It has been found that it is preferable to employ two chains attached at opposite sides to the plate 21, and to employ three and four with the plates 22 and 23 attached at equally spaced intervals on their peripheries. Suitable cutter elements 25 are attached to the chains at their ends and at spaced intervals along their lengths.

Spaced above each of the plates and attached to the wall and the spoke members adjacent thereto are inclined collars 26 which provide funnels for directing the material within the drum off the wall onto each of the plate and chain members just beneath. The embodiment of the invention illustrated includes three sets of plate and chain members and therefore three flights of material are provided for in the drum.

At the lower or discharge end of the drum a funnel 27 is positioned having its smaller end or outlet at the outlet 13 of the drum.

At the upper end of the drum an inlet aperture 28 is provided to receive a supply duct or conduit 29 to be more fully described. The duct 29 enters the aperture close to the wall thereof and with its nozzle or discharge end 30 directed along the inner circumference of the wall in order to impart a whirling motion to the material as it enters the drum.

Located adjacent and substantially beneath the drum 10 is a furnace 31 which is provided with a plurality of heating means 32 which may be of the gas or oil fired variety. The furnace has a frusto-conically shaped end portion 33 which is connected by a conduit or duct 34 to a substantially horizontal drum 35. A duct 36 leads from the outlet 13 of the drum 10 to the duct 34. Suitable flow adjusting means 37 is provided in the duct 36. An air inlet opening 38 having a damper 39 is located on the under side of the duct 34.

For admitting materials into the system a hopper 40 having a discharge duct 41 connected to the duct 36 is provided. The hopper is adapted for receiving various types of ensilage for treatment by the device. The materials may have been previously processed to some extent or may be fresh cut, and one or more types may be placed in the hopper in order that the various materials will be mixed. The invention contemplates the employment of conventional feeding means for moving material through the hopper, such as a driven screw feed.

The drum 35 is rotatably supported by rollers or the like 42 and is adapted to be driven by a suitable source of power or motor 43 having gears 44 in engagement with a ring gear 45 on the drum. A plurality of spaced angularly disposed baffles or paddles 46 are attached within the drum 35 for facilitating the movement of the materials within the drum.

The drum 35 has an inlet opening 47 and an end member or cover 48 which is adapted to remain stationary as the drum rotates. The cover is provided with a small aperture 49 near its upper periphery and a relatively large aperture 50 near its lower edge.

A discharge duct 51 is attached to the edges defining the opening 49 and leads to a reduced conduit 52 which has its exit at a suitable receptacle or other means for receiving the processed feed. For drawing feed and air into the duct 51 a blower or fan 53 is positioned in the duct and is driven by suitable means such as a motor 54. For regulating and varying the flow through the duct 51 a suitable damper 55 is provided for the opening 49.

A baffle 56 is attached to the end member 48 within the drum in order to facilitate division of the material flowing through the upper aperture 49 from that flowing through the lower aperture 50.

A discharge duct 58 is attached to the edges defining the opening 50 and is connected to a reduced conduit 59 which has its upper discharge end 30 within the drum 10. The discharge duct 58 includes a housing 60 in which is positioned a relatively large blower or fan 61 driven by a belt drive 62 powered by a motor 63. The fan is adapted to draw the relatively heavy material from the lower portion of the drum 35, the lighter and dry material being withdrawn through the duct 52 by means of fan 53.

In the operation of the device the feed which is to be processed is introduced into the system through the hopper 40. It is obvious that material could also be introduced at other positions such as near the top of the drum 10.

From the hopper 40 material gravitates into the conduits 36 and 34 where it is subjected to hot gases emanating from the burners 32 of the furnace 31. As the feed material is dried it is drawn by means of the fans 53 and 61 into the drum 35. In the drum 35 the feed is rotated slowly which assists its drying and mixing, the action being facilitated by the vanes 46 within the drum.

After being treated in the drum, portions of the dry material are drawn by the fan 53 out through the discharge duct 52. Other portions which contain more moisture and are heavier and larger than those passing out through the duct 52 are drawn by the fan 61 through the conduit 59 and deposited substantially tangentially within the drum 10 near its upper extremity.

As the material tends to fall within the drum 10 it is struck by each of the flights of rapidly revolving chains 24 which are attached to the discs 21, 22 and 23. Although the chains may be driven at various speeds, approximately 2,000 R. P. M. has been found to be preferable. At this velocity the chains tend to extend radially from their discs. By providing two chains on the discs 21 the downward passage of materials in the drum is impeded less than if more were provided at this stage. Additional chains are provided for the discs in succeeding stages in order that the materials may be progressively comminuted.

After passing the last set of chains the material gravitates through the funnel 27 past the damper 37 and into the conduits 36 and 34 for recycling. In the drum 10, the material may be subjected to an upward current of heated gas from the furnace 31 which rises through the duct 36.

Each time that material passes through the drum 35 a portion thereof is drawn out the discharge line 52 and the operation is continued until substantially all the material has been so discharged.

By varying the amount of heat applied, the final moisture content of the feed may be controlled and allowance made for the state of the material when it enters. For example, it may be desired to mix and comminute materials which are already relatively dry without withdrawing a substantial amount of additional moisture. In this instance the furnace may be adjusted to supply little or no heat.

It is contemplated that the space beneath the duct 34 and end portion 33 be used as a storage or for drying various commodities such as beef quarters. The damper 39 may be opened to permit air to be drawn into the duct 34 or to discharge feed from the duct in the event that it becomes clogged or for other reason.

It is apparent that the invention contemplates the provision of a system of cooperating devices including a relatively large drum in which feed materials may be comminuted, a furnace for supplying heat for drying the materials, and a second drum for thoroughly mixing the materials and for selectively separating the conditioned materials from those which require further processing.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A combination drier, mixer and comminutor for animal feed and the like, comprising an elongated vertical drum, a shaft supported in said drum and substantially axially thereof, means for rotating the shaft, spaced means on said shaft for attaching a plurality of chains, chains attached to the spaced means, cutter elements on the chains, funnel members disposed within the drum one spaced just above each spaced chain attaching means, the chains and the funnel members in combination with the drum providing therein a plurality of flights, an opening near the top of the drum for receiving feed, and a funnel at the bottom for dispensing feed, whereby feed received through the opening may graviate downwardly into an engagement with the chains of each flight for comminution and mixing; a furnace located near the bottom of the drum, heating means in said furnace, a discharge pipe connecting the funnel to the furnace whereby hot gases therefrom contact the feed, an air inlet in the connecting means, and means for regulating the flow through the discharge pipe and the air inlet means; a second drum substantially horizontally disposed with an end adjacent the furnace and the discharge pipe and connected thereto for receiving the heated feed, means for rotating the drum, paddles within the drum for moving the feed as the drum rotates, a first outlet near the top of the drum at the opposite end of the furnace, a second outlet below the first outlet and of relatively larger size, means for inducing air flow through the outlets, a conduit attached to the first outlet and leading to a discharge, and a conduit attached to the second outlet and leading to within the vertical drum and near its upper extremity, said last-mentioned conduit having a relatively broad flat cross section whereby movement of the feed from within the second drum through the conduit is expedited.

2. A combination drier, mixer and comminutor for animal feed and the like comprising an elongated vertical drum, a shaft supported in said drum and substantially axially thereof, means for rotating the shaft, spaced means on said shaft for attaching a plurality of chains, chains attached to the spaced means, cutter elements on the chains, the chains in combination with the drum providing therein a plurality of flights, an opening near the top of the drum for receiving feed, and a funnel at the bottom for dispensing feed, whereby feed received through the opening may graviate downwardly into an engagement with the chains of each flight for comminution and mixing; a furnace located near the bottom of the drum, heating means in said furnace, a discharge pipe connecting the funnel to the furnace whereby hot gases therefrom contact the feed, an air inlet in the connecting means, and means for regulating the flow through the discharge pipe and the air inlet means; a second drum substantially horizontally disposed with an end adjacent the furnace and the discharge pipe and connected thereto for receiving the heated feed, means for rotating the drum, paddles within the drum for moving the feed as the drum rotates, a first outlet near the top of the drum at the opposite end of the furnace, a second outlet below the first outlet and of relatively larger size, means for inducing air flow through the outlets, a conduit attached to the first outlet and leading to a discharge, and a conduit attached to the second outlet and leading to within the vertical drum and near its upper extremity, said last-mentioned conduit having a relatively broad flat cross section whereby movement of the feed from within the second drum through the conduit is expedited.

3. A combination drier, mixer and comminutor for animal feed and the like comprising an elongated vertical drum, a shaft supported in said drum and substantially axially thereof, means for rotating the shaft, spaced means on said shaft for attaching a plurality of chains, chains attached to the spaced means, cutter elements on the chains, the chains in combination with the drum providing therein a plurality of flights, an opening near the top of the drum for receiving feed, and means at the bottom for dispensing feed, whereby feed received through the opening may gravitate downwardly into an engagement with the chains of each flight for comminution and mixing; a furnace located near the bottom of the drum, heating means in said furnace, a discharge pipe connecting the drum to the furnace whereby hot gases therefrom contact the feed, and means for regulating the flow through the discharge pipe; a second drum substantially horizontally disposed with an end adjacent the furnace and the discharge pipe and connected thereto for receiving the heated feed, means for rotating the drum, paddles within the drum for moving the feed as the drum rotates, a first outlet near the top of the drum at the opposite end of the furnace, a second outlet below the first outlet and of relatively larger size, means for inducing air flow through the outlets, a conduit attached to the first outlet and leading to a discharge, and a conduit attached to the second outlet and leading to within the vertical drum and near its upper extremity, said last-mentioned conduit having a relatively broad flat cross section whereby movement of the feed from within the second drum through the conduit is expedited.

4. A combination drier, mixer and comminutor for animal feed and the like comprising an elongated vertical drum, a shaft supported in said drum and substantially axially thereof, means for rotating the shaft, spaced means on said shaft for attaching a plurality of cutting members, cutting members attached to the spaced means, the cutting members in combination with the drum providing therein a plurality of flights, an opening near the top of the drum for receiving feed, and means at the bottom for dispensing feed, whereby feed received through the opening may gravitate downwardly into an engagement with the cutting members of each flight for comminution; a furnace located near the bottom of the drum, heating means in said furnace, a discharge pipe connecting the drum to the furnace whereby hot gases therefrom contact the feed, and means for regulating the flow through the discharge pipe; a second drum substantially horizontally disposed with an end adjacent the furnace and the discharge pipe and connected thereto for receiving the heated feed, means for rotating the drum, a first outlet near the top of the drum at the opposite end of the furnace, a second outlet below the first outlet and of relatively larger size, means for inducing air flow through the outlets, a conduit attached to the first outlet and leading to a discharge, and a conduit attached to the second outlet and leading to within the vertical drum and near its upper extremity.

5. In combination, an elongated vertical drum having a receiving opening adjacent its upper extremity and a discharge opening adjacent its lower, a shaft within said drum, a plurality of collars positioning the shaft, spokes attached to each of the collars and to the wall of the drum for supporting the collars, a thrust bearing supporting the shaft, spokes supporting the thrust bearing and attached to the drum, a motor, driving means between the motor and the shaft, a plurality of flails positioned in spaced relation along the shaft, downwardly and inwardly inclined frusto conical collars supported by the spokes and positioned just above each of the flails, the spokes and the inclined collars providing a plurality of flights within the drum, whereby material introduced through the upper opening may gravitate downwardly and be engaged by the flails of each flight and be discharged through the lower opening.

6. A combination drier, mixer and comminutor for material for animal feed and the like, comprising an elongated vertical drum, a shaft rotatably supported in the drum, means for rotating the shaft, a plurality of flails attached in spaced relation at one or more positions along the shaft, means for directing material within the drum into position for comminuation by the flails; a second drum substantially horizontally disposed near the discharge opening of the vertical drum, conduit means connecting the drums, means for directing heated gases into the conduit means between the drums whereby material passing through the vertical drum and into the second drum will be heated and moisture removed therefrom, means for rotating the second drum and for displacing material therein, a first outlet near the upper portion of the second drum, conduit means extending from said outlet and means for drawing material therethrough, a second outlet of relatively larger size near the lower portion of the drum, conduit means attached to said second outlet and extending to the inlet of the vertical drum, and means for drawing material through the second outlet and the conduit and discharging the same into the vertical drum whereby material may be comminuted, dried and mixed to a desired degree.

J. O. ALLSTOTT.

REFERENCES CITED

The following references are of record in the file of this patent:

UNITED STATES PATENTS

| Number | Name | Date |
| --- | --- | --- |
| 777,228 | Upton | Dec. 13, 1904 |
| 1,212,418 | Sturtevant | Jan. 16, 1917 |
| 1,297,497 | Rosenthal | Mar. 18, 1919 |
| 1,635,453 | Agnew | July 12, 1927 |
| 1,636,033 | Agnew | July 19, 1927 |
| 1,798,465 | Grindle | Mar. 31, 1931 |
| 1,994,343 | Graves | Mar. 12, 1935 |
| 2,213,668 | Dundas et al. | Sept. 3, 1940 |
| 2,446,952 | Randolph | Aug. 10, 1948 |